United States Patent Office

3,310,581
OXIDATION OF ALKYL-SUBSTITUTED AROMATIC COMPOUNDS
Joseph R. Mares, Chamber of Commerce Bldg., Houston, Tex. 77002
No Drawing. Filed Mar. 2, 1964, Ser. No. 348,789
9 Claims. (Cl. 260—524)

The present application is a continuation-in-part application of Ser. No. 56,684, now abandoned, filed Sept. 19, 1960, in the name of Joseph R. Mares.

The present invention relates to the preparation of aromatic carboxylic acids and, more particularly, to the conversion of one or more alkyl groups of alkyl substituted mono and polycyclic aromatic compounds to a carboxyl group or carboxyl groups to provide the corresponding aromatic carboxylic acids either as the free acids or the salts thereof. The present invention also relates to the aforesaid conversion of one or more alkyl groups of nuclear halogenated mono- or polycyclic alkylated aromatic hydrocarbons. While alkyl chains of substantially any length can be converted to carboxyl groups economically, it is not advantageous to employ, as feed hydrocarbons, aromatic hydrocarbons having more than three carbon atoms in the alkyl chain or chains.

As employed hereinbefore and hereinafter, the phrase—nuclear halogenated mono- or polycyclic aromatic hydrocarbons—includes alkylated members of the benzene, naphthalene and diphenyl aromatic hydrocarbons having nuclear substituted chlorine or bromine or, in general, the hydrocarbon feed can be one or more, usually one, aromatic hydrocarbon corresponding to the formula:

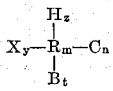

where
R is an aromatic hydrocarbon nucleus,
m is 6, 10, 12 and the number of carbon atoms in said aromatic nucleus,
C is an alkyl group having 1 to 3 carbon atoms,
n is 1 to 3,
X is chlorine or bromine,
y is zero to $m-(n+t+z)$,
B is carboxyl (—COOH),
t is 1 to 2,
H is hydrogen
z is $m-(2+n+t+y)$ to $m-(n+t+y)$ It has been proposed heretofore to produce benzoic acid from toluene or terephthalic acid from paraxylene by reacting sodium dichromate with the hydrocarbon in aqueous medium. The process, while quite efficient in terms of chemical usage, is handicapped by the large quantity of reagents and chrome oxide required to be handled. It has also been proposed to oxidize the hydrocarbons with air or oxygen. In general the vapor phase process is not satisfactory for the manufacture of polycarboxylic acids other than those which form inner anhydrides. On the other hand, the liquid phase processes present serious problems of corrosion, explosion hazards and multi-stage operations involving special treatment of intermediate oxidized derivatives.

Carboxylic acids are formed by the nitric acid oxidation of the corresponding alkyl aromatics such as paraxylene or diisopropyl benzene. Here, difficulty stems from materials of construction and the need for concentrated nitric acid, especially when producing substituted benzoic acids or polycarboxylic acids. Furthermore, the nitric oxides which this oxidation produces must be reoxidized to produce dilute nitric acid which in turn must be concentrated.

The present invention overcomes to a large extent the disadvantages enumerated above. According to this process, the alkyl aromatic hydrocarbon or its nuclear halogenated derivative which is to be converted to the corresponding carboxylic acid in the form of its inorganic salt is caused to react in liquid phase with an aqueous solution of an inorganic nitrate or nitrite salt, i.e., a salt of a nitrogen oxide acid, whereby the corresponding carboxylic acid salt is formed. While the mechanism of the reaction is not fully understood, it appears to be such that the anion of the salt of the nitrogen oxide acid is converted predominantly to ammonia. The reaction is illustrated, as applied to an alkyl benzene, e.g., toluene, by the equation:

(1) 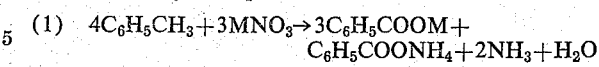

Acidification of the reaction mixture with mineral acid, e.g., nitric acid, hydrogen halide, sulfuric acid, precipitates the free carboxylic acid. When acidifying the reaction mixture with nitric acid the inorganic nitrate salt is regenerated and the aqueous solution thereof is available for reuse after separating the precipitated organic acid. This can be illustrated by the equation:

(2) 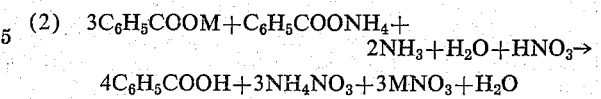

Inasmuch as one can use nitrites as well as nitrates in the present invention, it is not necessary to use nitric acid per se to precipitate the carboxylic acid but on the contrary the gaseous mixture obtained from the oxidation of ammonia with air can be used to liberate, i.e., precipitate the carboxylic acid.

The ammonia values can be recovered by distilling the aqueous solution in the presence of alkali after which the benzoic acid is sprung by acidification with mineral acid. As disclosed above, the use of nitric acid or mixed nitric oxides results in restoring the oxidant for repeated use. To this end and in order to maintain a balance between the amount of oxidant so produced, the excess free ammonia is first stripped with steam after which the organic acid is sprung with the nitric acid or nitric oxides.

While the yield of carboxylic acid when employing nitrogen oxide acid salts of monovalent metals such as the alkali metals and ammonium as the sole oxidant is not economically attractive, it has been found that nitrogen oxide acid salts of polyvalent metals such as chromium when used as the sole oxidant give improved yields compared to the yields of carboxylic acid obtained when employing nitrogen oxide acid salts of the alkali metals and ammonia. However, preferred results are obtained when the reaction mixture contains, in addition to at least one nitrogen oxide acid salt of alkali metal or ammonia, at least one water-soluble compound of a polyvalent metal of Groups Ib, IIb, IIIb, Va, VIa, VIb having an atomic number 34 and 52 and Group VIII of the Periodic Table of elements. Thus, for example, when using chromium nitrate to convert toluene to benzoic acid or p-xylene to toluic acid or terephthalic acid, the following results have been obtained.

An autoclave equipped to agitate the contents was charged with 12 grams of chromium nitrate, 1 gram potassium dichromate, 200 grams of water and 22 grams of p-xylene. The total volume of the autoclave is about double the volume occupied by the liquid reaction mixture at ambient temperature. The contents were heated to about 325° C. and held at this temperature for about one hour after which the autoclave was allowed to cool to ambient temperature. After filtering the cooled reaction mixture to remove solids such as green chromic oxide, hydrochloric acid was added to the cooled reaction mixture to precipitate the produced carboxylic acids. The acidified solution was filtered and the filter cake washed thoroughly. The washed filter cake was then dried and 2.8 grams of colorless acid product were obtained. This acid product had an acid equivalent of 118. However, it is preferred to use a salt of a nitrogen oxide acid and an alkali metal or ammonia for convenience in purification and from consideration of costs.

Illustrative of the reactants which can be used to produce aromatic carboxylic acids are the results tabulated hereinafter. In general, the reaction mixture is filtered to remove reaction-mixture insolubles, the aromatic carboxylic acid is sprung from the reaction salt by acidification of the filtered reaction mixture and the substantially water-insoluble free aromatic carboxylic acid recovered by filtration or centrifuging as a cake. This cake is water washed and dried.

It is to be noted that when a metal such as the alkaline earths is present in the reaction mixture a portion of the aromatic carboxylic acid is removed as a water-insoluble salt when the reaction mixture is filtered to remove the reaction-mixture insolubles. However, this portion of the aromatic carboxylic acid can be converted into a water-soluble salt of the aromatic carboxylic acid by digesting the reaction-mixture insoluble with caustic soda or soda ash in aqueous solution. The free aromatic carboxylic acid is recovered from the aqueous solution of the alkali metal salt thereof obtained by digesting the reaction-mixture insolubles with alkali metal carbonate or hydroxide by acidifying the aqueous solution of the alkali metal salt of the aromatic carboxylic acid from the reaction-mixture insolubles not soluble in the aqueous alkali metal carbonate or aqueous alkali metal hydroxide.

increases and impairs the yield or recovery of the product.

In the interest of conserving oxidant it is preferable to use an organic raw material having methyl substituents, however, the invention is not so limited and can be applied to the higher alkyl compounds such as ethyl or isopropyl derivatives. Thus, it is preferred to use as starting materials aromatic hydrocarbons having one or more alkyl substituents having not more than three carbon atoms in the substituent alkyl group as for example, toluene, ortho-xylene, meta-xylene, para-xylene, pseudocumene, methylnaphthalene, and methyl diphenyl. The nuclear halogenated alkylhydrocarbons having not more than three carbon atoms in the substituent group or groups (for reasons of economy) also serve as starting material for producing the corresponding nuclear halogenated carboxylic acid or salt. Thus, for example, monochlorotoluene, 2,3-dichlorotoluene, 3,4-dichlorotoluene, 2,3-dichloroparaxylene, 2,4-dichloroparaxylene and similar nuclear halogenated aromatic hydrocarbons can be converted to the corresponding nuclear halogenated aromatic carboxylic acids or salts. It is to be observed that when the alkyl substituted aromatic hydrocarbon or nuclear substituted aromatic hydrocarbon has more than one alkyl group, the reaction proceeds in a step-wise fashion. Accordingly, by regulating the time of the reaction or the temperature, one can recover a substantial portion of the product as the alkyl carboxylic acid (or salt). Thus, in the conversion of paraxylene, the reaction can be controlled to produce either predominantly paratoluic acid $CH_3C_6H_4COOH$ or terephthalic acid $C_6H_4(COOH)_2$. Similarly, the polyalkylated polycyclic aromatic hydrocarbons can be converted in a step-wise fashion to alkyl carboxylic acids or polycarboxylic acids by regulating the

| | Water, gr. | Alkyl Aromatic | Catalyst | Activator | Reaction Time | Reaction Temp., °C. | Recovered Acid Material, gr. | Acid Equivalent |
|---|---|---|---|---|---|---|---|---|
| $NaNO_3$: | | | | | | | | |
| 25 gr | 200 | Ethyl Benzene, 26 gr | 1.5 gr. $K_2Cr_2O_7$ | $H_2SeO_3$, 0.05 gr | 1 hr | 325 | 15.91 | 119.7 |
| 12 gr | 200 | α-methyl naphthalene, 10 gr | 1.0 gr. $K_2Cr_2O_7$ | $H_2SeO_3$, 0.05 gr | 1 hr | 325 | 7.9 | 191.0 |
| $Mg(NO_3)_2$, 10 gr | 200 | p-xylene, 22 gr | 1.0 gr. $K_2Cr_2O_7$ | $H_2SeO_3$, 0.05 gr | 1 hr | 325 | ¹ 7.8 | 92.0 |
| $Cr(NO_3)_3$, 12 gr | 200 | ----do---- | 1.0 gr. $K_2Cr_2O_7$ | | 1 hr | 325 | 2.8 | 118 |
| $NaNO_3$, 25 gr | 200 | 4-methyl diphenyl | 1.0 gr. $K_2Cr_2O_7$ | $H_2SeO_3$, 0.05 gr | 1 hr | 325 | 15 | 142 |
| $NaNO_3$, 24 gr | 200 | Pseudocumene, 25 gr | 1.0 gr. $K_2Cr_2O_7$ | $H_2SeO_3$, 0.05 gr | 2 hrs | 340 | 12.5 | 91 |

¹ Includes acid recovered from reaction-mixture insolubles by digesting the reaction-mixture insolubles with soda-ash solution and recovering the free acid from the aqueous sodium carbonate solution.

In general, the reaction proceeds at a lower temperature in the presence of more than one metal salt. Distinctly higher conversions result when at least one of the salts is of a polyvalent metal, particularly a metal of the left-hand column of Group V, the left-hand column of Group VI, of the iron group of Group VIII, selenium or tellurium and the rare earths, for economic reasons, cerium. In many instances the improved yields can be obtained with amounts of the salt of the polyvalent metal or salts of the polyvalent metals which are catalytic, e.g., 0.2 to 20% by weight of the alkali metal salt of nitrogen oxide acid. Thus, with alkali metal or ammonium nitrates, water soluble chromium salts such as the nitrate or the alkali metal dichromate or chromate are outstanding either alone or in combination with other polyvalent metal compounds such as selenium oxide. Similar synergistic effects are displayed by other polyvalent metal salts when used in combination. While it is generally preferred to use the polyvalent metal as a water-soluble salt of a nitrogen oxide acid, e.g., the nitrate, other water-soluble compounds of the polyvalent metals, such as the oxides, hydroxides, chlorides, and sulfates can be used.

In contrast to many of the processes which have been used, the present process proceeds in liquid phase and under a neutral or alkaline condition. Indeed it is desirable to keep the reaction from becoming acidic since under such conditions decarboxylation of the organic acid time or temperature of the reaction. Thus, dimethyl naphthalene is converted to methyl naphthalene carboxylic acid $CH_3C_{10}H_6COOH$ (methyl naphthoic acid) or naphthalene dicarboxylic acid $C_{10}H_6(COOH)_2$.

Illustrative of a preferred method of converting alkyl aromatic hydrocarbons and nuclear halogenated alkyl aromatic hydrocarbons to the corresponding alkyl carboxylic acid or dicarboxylic acid is the conversion of paraxylene to terephthalic acid.

The principles of the present invention are illustrated by the following examples. In addition, a tabulation of the results obtained reveals the wide variety of conditions that may be employed.

An autoclave (Type 316–18–8 stainless steel) equipped to agitate the contents is charged with 20 grams of sodium nitrate, 150 grams of water together with 24 cc. of paraxylene and about 5 percent based on the nitrate, i.e., 1.0 gram of sodium dichromate. The total volume of the autoclave is such that the vapor space is approximately equal to the space occupied by the liquid at ambient temperature. The contents are heated to 350° C. and allowed to react for approximately one hour at this temperature after which the autoclave is allowed to cool to room temperature.

After filtering the reaction mixture to remove trace quantities of foreign material and a small amount of green chromic oxide, a clear or faintly yellow solution, occasioned by the chromate ion present, having a pH of about 10 results. By adding an excess of muriatic acid and filtering, there is obtained after thorough water washing, and drying at 105° C., 16.08 grams of colorless acid product. Since toluic acid is slightly soluble in hot water, the temperature and volume of wash water used should be restricted. By dissolving in excess alkali and back-titrating with mineral acid, a sample of the product was found to have an acid equivalent value of 82.3 thus indicating substantially no toluic acid. For the purpose of this analysis a weighed sample is dissolved in a known volume of standardized caustic soda solution and the excess alkali determined by back-titration with standard mineral acid to a phenolphthalein end point conveniently at about 75° C.

In the following table, the same reactants are employed under varying conditions to illustrate the effect of temperature, time, concentration of reactants, etc. In judging these data, the expression "acid equivalent" should be understood to mean the grams of organic acid product required to neutralize one mol of caustic soda. From the acid equivalent data, the percent of the dicarboxylic acid has been estimated. The foregoing analytical procedure has been followed and has been found to be accurate to within a few percent as compared to more involved and refined techniques. It does entail a minimization due to solubility of toluic acid in the wash water used to remove the mother liquor from the acidified reaction mixture. All of the data as reported here were developed by the same procedure.

In the series (A) the effect of adding varying amounts of a soluble bichromate is illustrated from which it is apparent that its concentration does effect the total yield of organic acid as well as the percent terephthalic present in the mixed acid product recovered.

In Series B the effect of duration of reaction on the yield as well as extent of conversion to the terephthalic acid is illustrated.

Series C concerns the effect of temperature.

The effect of lag-time is overcome to some extent in Series D where the reaction time was two hours, whereas in Series C the reaction time was, with a single exception, one hour. Taken together, these Series C and D show not only the effect of time but also the effect of temperature.

The effect of concentration of nitrate in the aqueous solution is displayed in Series E where each run was started with fresh reactants. In other words, the effect of regenerated nitrate as described earlier is not introduced in any of these series.

|  | $NaNO_3$, grams | Para-xylene in cc. | $K_2Cr_2O_2$, grams | $H_2O$, grams | Time, Hours | Temp., °C. | Recovered Acid Product, grams | Percent Terephthalic Acid |
|---|---|---|---|---|---|---|---|---|
| Series A | 27 | 32 | 4.5 | 200 | 1 | 325 | 16.3 | 78 |
|  | 20 | 24 | 3 | 150 | 1 | 350 | 16.08 | 100 |
|  | 20 | 24 | 1 | 150 | 1 | 350 | 12.68 |  |
|  | 27 | 32 | .65 | 200 | 1 | 350 | 10.7 | 50 |
| Series B | 27 | 32 | 1.3 | 200 | .5 | 325 | 3.72 | 16.5 |
|  | 27 | 32 | 1.3 | 200 | 2 | 325 | 16.78 | 64 |
|  | 27 | 32 | 1.3 | 200 | 3 | 325 | 19.00 | 78 |
| Series C | 26 | 32 | 1.3 | 200 | 1 | 300 | 2.31 | 7.0 |
|  | 27 | 32 | 1.3 | 200 | 1 | 315 | 10.0 | 45.0 |
|  | 27 | 32 | 1.3 | 200 | 1 | 325 | 13.24 | 52.0 |
|  | 27 | 32 | 1.3 | 200 | 1 | 335 | 17.02 | 46.7 |
|  | 27 | 32 | 1.3 | 200 | 1 | 350 | 22.56 | 69.0 |
|  | 27 | 32 | 1.3 | 200 | .5 | 350 | 12.8 | 82.0 |
| Series D | 27 | 32 | 1.3 | 200 | 2 | 300 | 7.62 | 52 |
|  | 27 | 32 | 1.3 | 200 | 2 | 300 | 9.65 | 44 |
|  | 27 | 32 | 1.3 | 200 | 2 | 315 | 13.62 | 61 |
|  | 27 | 32 | 1.3 | 200 | 2 | 325 | 16.78 | 64 |
|  | 27 | 32 | 1.3 | 200 | 2 | 330 | 19.52 | 68 |
| Series E | 44 | 32 | 1.3 | 200 | 1 | 325 | 8.32 | 50 |
|  | 32 | 32 | 1.3 | 200 | 1 | 325 | 13.06 | 52.2 |
|  | 27 | 32 | 1.3 | 200 | 1 | 325 | 13.24 | 52.0 |
|  | 22 | 32 | 1.3 | 200 | 1 | 325 | 14.37 | 55.5 |
|  | 16 | 32 | 1.3 | 200 | 1 | 325 | 10.36 | 40.0 |
|  | 13.5 | 32 | 1.3 | 200 | 1 | 325 | 4.68 | 25.0 |

While higher temperatures favor reaction rate increase they impose mechanical problems. In general it is preferred to use a temperature of at least 275° C. but below the critical temperature of water or the aqueous oxidant. The range of 315° C. to 350° C. has been found convenient. The specific polyvalent metal as well as its concentration, especially when the oxidant is an alkali or alkaline earth salt of an acid of nitrogen oxide, has a significant effect on reaction rate. Chromium has been found to be outstanding although others are operative. Even with chromium, a choice exists. Thus, in general chromic acid salts, notable dichromates and trichromates of alkali metals, have been found preferable to the trivalent chromium salts. Combinations of polyvalent metals, especially those of the fifth and sixth groups of the Periodic Table, complement each other in this process to varying degrees. Combinations of polyvalent metal activators which react in the aqueous system to form stable insoluble salts are sometimes less effective than the individual polyvalent metal; thus, for example, lead nitrate and sodium dichromate appear to form a lead chromate that is somewhat less active than the water-soluble dichromates. By contrast, chromic oxide as generated in the process in a more or less hydrated form, appears to have adequate solubility and catalytic activity. Finally, the acidity or alkalinity of the starting reaction mixture has been observed to have a significant bearing on the degree of activity of the reaction system. Thus, whereas alkali retards, small amounts of mineral or organic acid help to activate the system which is surprising when one takes into account the fact that as the oxidant is consumed, alkalinity is developed in the reaction system. It is not uncommon with a highly reactive polyvalent metal system to observe a pH of 9 or 10 at the end of a run. It should be noted here that the amount of acid that can be introduced is limited by secondary reactions that cause decarboxylation. This effect is pronounced with $CO_2$ or mineral acids. It should also be noted that the oxidation reaction itself is apparently not inhibited but rather that the carbonyl or carboxylic product formed is converted to a partiallly or totally decarboxylated derivative which may or may not be desired when using my process.

This process is not limited to activation by mineral acid. Thus, as the data show, toluic acid is converted with surprising facility to terephthalic in a chromium catalyzed system with trace quantities of benzene, isoheptane, xylene, nitrobenzene, cyclohexane, normal hexane and paraformaldehyde. Similarly, meta toluic acid is activated to form isophthalic acid when subjected to conditions of reaction that are described herein. The use of hydrocarbons to activate the conversion is advantageous when compared to the use of mineral acids since excessive amounts of mineral acids accentuates the tendency toward decarboxylation. The effect as activators of acids and alkalis as well as non-acidic organic compounds is displayed in Series F. As indicated elsewhere, strong alkalis tend to retard reaction rate, when present in the initial reaction mixture yet this retardation can be overcome to a considerable extent by the non-acidic organic compounds.

In Series G results involving a variety of reactants and polyvalent catalysts are reported. In Series H is to be found examples of the invention as applied to alkyl aromatic carboxylic acids as the feed material to be oxidized vis-a-vis Series F which includes examples of salts of such alkyl acids.

Series I illustrates the application of this invention to a sequence operation in which the reaction mixture obtained using 27 grams of sodium nitrate and 1.3 grams of $K_2Cr_2O_7$ is acidized to spring the organic acid product after which the filtered solution, containing the soluble chromium values in the form of nitrate, is reacted a second time with paraxylene. The lower acid equivalent number in the second run can be accounted for in part by the fact that some of the toluic acid formed in the first run remained in solution and was recycled. It should be noted that a considerable portion of the oxidant in the second run was probably present as ammonium nitrate due to the generation of ammonia in the first oxidation run and which combined with nitric acid used to spring the organic acids.

alkalinity and temperature of the system. At this time, a complete explanation of the mechanism whereby the nitrate or nitrite oxidant is converted to ammonia at the expense of the alkyl group which is oxidized to a carbonyl derivative is not known; therefore, the phenomena are referred to as a reduction of the salt of an acid of a nitrogen oxide and as an oxidation of the alkyl radical of an aromatic compound.

When chlorine substituted aromatic hydrocarbons are used as raw materials, there is a tendency especially under highly alkaline reaction conditions to hydrolize some of the chlorine forming phenolic derivatives while effecting the oxidation of the alkyl radical. This effect if undesirable from considerations of end product requirement can be reduced if one suppresses alkalinity build-up by gradual addition of acid or use of buffers. Even when such hydrolysis is not a factor, as when the alkyl aromatic is a hydrocarbon, addition of a buffer or free acid as the reaction proceeds is useful to maintain a controlled reaction rate.

It is to be observed that in the claims the term "alkyl aromatic hydrocarbon" includes nuclear halogenated aromatic hydrocarbons as well as aromatic hydrocarbons devoid of halogen.

As has been stated hereinbefore, the oxidation reaction proceeds step-wise. Thus, paraxylene and paratoluic acid, react under similar conditions to form terephthalic acid. The precipitated organic acid product resulting from the oxidation of xylene after being carefully dried can be resolved into terephthalic acid and paratoluic acid by extraction with substantially anhydrous ethyl alcohol. The toluic acid is quite soluble as compared to the terephthalic acid. By diluting the alcohol extract with water, toluic acid of high purity (acid equivalent 134) is precipitated.

The resulting alcohol insoluble residue consists predominantly of terephthalic acid. Depending upon the

| | $NaNO_3$, grams | $H_2O$, ccs. | | $K_2Cr_2O_7$, grams | Activator | Time, hours | Temp., °C. | Recovery, grams | Acid Equivalent |
|---|---|---|---|---|---|---|---|---|---|
| Series F | 14 | 200 | 18 gr. Na-p-toluate | 1.3 | 0 | 1 | 325 | 11.7 | 114 |
| | 12 | 200 | 8.2 Sodium Para Toluate grams. | 1.5 | .5 cc. paraxylene | 1 | 335 | 9.05 | 89.7 |
| | 12 | 200 | do | 1.2 | .5 cc. benzol | 1 | 325 | 8.37 | 91.8 |
| | 12 | 200 | do | 1.2 | 1 cc. N hexane | 1 | 325 | 6.74 | 120.8 |
| | 12 | 200 | do | 1.2 | 1 cc. cyclohexane | 1 | 325 | 7.0 | 100 |
| | 12 | 200 | do | 1.2 | 1 cc. nitrobenzene | 1 | 325 | 4.0 | |
| | 27 | 200 | 32 cc. Para xylene | 1.5 | 1 gr. $HNO_3$ | 1 | 300 | 3.42 | 110 |
| | 27 | 200 | do | 1.5 | 1 gr. $HNO_3$ | 1 | 315 | 6.97 | 109 |
| | 27 | 200 | do | 1.5 | 1 gr. $HNO_3$ | 1 | 325 | 13.98 | 99 |
| | 27 | 200 | do | 1.5 | 1 gr. $HNO_3$ | 1 | 335 | 17.95 | 96 |
| | 27 | 200 | do | 1.3 | 1 cc. benzol, .12 gr. NaOH | 1 | 335 | 16.64 | 99.5 |
| | 27 | 200 | do | 1.3 | 1 cc. benzol, .48 gr. NaOH | 1 | 325 | 2.18 | 118 |
| | (¹) | 200 | do | 1.15 | 5 gr. $HNO_3$ | 1 | 325 | 2.08 | |
| | 27 | 200 | do | | $SeOCl_2$ 1.5 gr | 1 | 325 | 1.25 | |
| | 27 | 200 | do | 1.5 | 0 | 1 | 325 | 15.03 | 100.8 |
| | 27 | 200 | do | 1.5 | $SeOCl_2$ 1.5 gr | 1 | 325 | 18.91 | 97.0 |
| Series G | 27 | 200 | 32 cc. p-xylene | 1.5 | Ammonium vanadate, 1 gr | 1 | 325 | 14.6 | 91 |
| | 27 | 200 | do | 0 | $SeO_2Cl$ 1.5 gr., Ammonium vanadate, 1.0 gr. | 1 | 325 | 3.67 | 127 |
| | 27 | 200 | do | 0 | $Cr(SO_4)_3$ 1.0 gr., $NH_4OH$, .5 cc | 1 | 325 | 9.41 | 108 |
| | 27 | 200 | do | 1.5 | Ammonium phospho. molybdate, 1.0 gr. | 1 | 325 | 22.27 | 95 |
| | 0 | 200 | 16 cc. p-xylene | 1.3 | $Al(NO_3)_3$ $9H_2O$, 60 gr | 1 | 325 | 19.34 | |
| | 0 | 200 | 32 cc. p-xylene | 0 | $Ba(NO_3)_2$, 29.6 gr | 3 | 350 | 2.4 | |
| | 0 | 200 | do | 1.5 | $NaNO_2$, 40 gr | 3 | 330 | 3.4 | 91 |
| | 0 | 200 | 16 cc. p-xylene | .2 | $Mg(NO_3)_2$, 14 gr | 1 | 325 | 4.72 | 106 |
| | 27 | 200 | 32 cc. p-xylene | 1.5 | Osmium oxide | 1 | 325 | 15.1 | 101 |
| Series H | 9.6 | 150 | 12 p-toluic acid | 1.3 | 0 | 1 | 325 | 10.72 | 89 |
| | 9.6 | 150 | 12 m-toluic acid | 1.3 | 0 | 1 | 325 | 8.40 | 93 |
| Series I | 27 | 200 | 32 cc. p-xylene | 1.3 | 0 | 1 | 335 | 16.64 | 99 |
| | 0 | (²) | do | 0 | 0 | 1 | 335 | 12.74 | 86 |

¹ 20 gr. $NH_4NO_3$. No $NaNO_3$.
² Acidified filltrate.

In the specification and claims, a number of elements are identified as promoting catalysis or synergism; this is to be understood in context to refer to compounds of such elements, usually water-soluble salts or oxides in various states of hydration brought on by the water, degree of severity of the oxidation conditions it may show an acid equivalent value as high as 90 or 95. However, by repeated extraction with hot anhydrous ethyl alcohol, values of 84 to 85 can be achieved. This alcohol soluble fraction of the crude dicarboxylic acid after repeated fractional crystallization has an acid equivalent of 130 to 132. Based on its melting and acid equivalent value the material was identified as 4,4'-dicarboxy stilbine or ethylene dibenzoic acid.

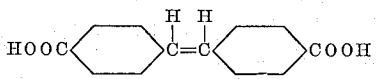

Further evidence that stilbenes or diphenyl ethylene and ethylene dibenzoic acid are in fact intermediates of oxidation in the invention here described for converting alkyl aromatic hydrocarbons to form the corresponding carboxylic acid rests in the discovery that when the foregoing stilbene or diphenyl ethylene is subjected to the identical reaction conditions as are hereinbefore described for the alkyl hydrocarbon or alkyl aromatic carboxylic acid, the double bond of the molecule produces two carboxyl groups—in the form of the salt. Thus, when the foregoing 4,4'-dicarboxy stilbene having an acid equivalent of 130 is so treated, terephthalic acid having an acid equivalent of 85 is recovered upon filtration and acidification as described hereinbefore.

From which it follows that among the products of the reaction, dependent upon the severity of the reaction conditions, are (1) the monocarboxylic acid of the aromatic starting material, (2) the dicarboxylic acid of the aromatic starting material, (3) ethylene disubstituted by the aromatic starting material, and (4) ethylene disubstituted by the monocarboxylic acid of the starting material. All of the acidic products being present in the reaction mixture as salts thereof.

What is claimed is:

1. The method of oxidizing an alkyl group attached to an aromatic nucleus which comprises heating an aromatic compound represented by the formula

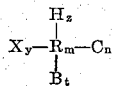

where

R is an aromatic hydrocarbon nucleus, $m$ is 6, 10, 12 and the number of carbon atoms in said aromatic nucleus, C is an alkyl group having 1 to 3 carbon atoms, $n$ is 1 to 3, $x$ is chlorine, $y$ is zero to $m-(n+t+z)$, $t$ is zero to 2, H is hydrogen, B is carboxyl (COOH), $z$ is $m-(2+n+t+y)$ to $m-(n+t+y)$, in the presence of an aqueous solution containing at least one salt of a nitrogen oxide acid and an anion selected from the group consisting of alkali metals, ammonium, alkaline earth metals, and polyvalent metals having two stages of oxidation of Groups Ib, IIb, IIIb, Va, VIa, VIb having atomic number of 34 and 52, and VIII of the Periodic Table of Elements, the temperature of said heating being in the range of about 275° C. and less than the critical temperature of said aqueous solution.

2. The method of oxidizing an alkyl group as set forth in claim 1 wherein the aqueous solution contains a water-soluble compound of at least one of selenium, vanadium, molybdenum, magnesium, osmium, tellurium, and rare earths.

3. The method of oxidizing an alkyl group as set forth in claim 1 wherein $m$ is 6, wherein the salt of the nitrogen oxide acid is a nitrate of at least one of sodium, potassium and ammonium, and wherein said aqueous solution contains at least catalytic amounts of a water-soluble compound of at least one of vanadium, selenium and chromium.

4. The method of oxidizing an alkyl group as set forth in claim 1 wherein $n$ is 1 or 2 and wherein the anion of the salt of a nitrogen oxide acid it as least one of sodium, potassium, and ammonium.

5. The method of oxidizing an alkyl group as set forth in claim 1 wherein $m$ is 6, C is methyl, wherein $n$ is 1 to 3, wherein $t$ is zero, wherein $y$ is zero and wherein the aqueous solution contains a nitrate of at least one of sodium, potassium, and ammonium and at least catalytic amounts of a water-soluble compound of chromium.

6. The method of oxidizing an alkyl group as set forth in claim 5 wherein the aromatic compound is paraxylene and wherein the heating is continued to form salts of paratoluic acid, terephthalic acid, and 4,4'-dicarboxylic-stilbene.

7. The method of oxidizing an alkyl group as set forth in claim 1 wherein $m$ is 6, $n$ is 1 or 2, $y$ is zero, and $t$ is zero or 1, wherein the aqueous solution contains a nitrate of at least one of sodium, potassium and ammonium and a water-soluble compound of chromium.

8. The method of oxidizing an alkyl group as set forth in claim 4 wherein C is ethylene and $n$ is 1.

9. The method of oxidizing an alkyl group as set forth in claim 1 wherein $m$ is 6, C is selected from the group methyl, ethyl and isopropyl, and wherein the aqueous solution contains a nitrate of at least one of sodium, potassium, and ammonium and at least catalytic amounts of a water-soluble compound of chromium.

References Cited by the Examiner

UNITED STATES PATENTS 2,120,672 6/1938 Mares _____ 260—524
2,985,211 3/1961 Girard _____ 260—523

LORRAINE A. WEINBERGER, *Primary Examiner.*

RICHARD K. JACKSON, *Examiner.*

S. B. WILLIAMS, *Assistant Examiner.*